(12) United States Patent  
Gustafsson et al.

(10) Patent No.: US 10,358,791 B2  
(45) Date of Patent: *Jul. 23, 2019

(54) LAYING MACHINE

(75) Inventors: Lars Gustafsson, Toreboda (SE); Rolf Johansson, Glumslov (SE); Donald Meister, Overland Park, KS (US)

(73) Assignee: HUSQVARNA AB, Huskvarna (SE)

( * ) Notice: Subject to any disclaimer, the term of this patent is extended or adjusted under 35 U.S.C. 154(b) by 1046 days.

This patent is subject to a terminal disclaimer.

(21) Appl. No.: 13/393,815

(22) PCT Filed: Jan. 26, 2011

(86) PCT No.: PCT/SE2011/000013  
§ 371 (c)(1),  
(2), (4) Date: Sep. 12, 2012

(87) PCT Pub. No.: WO2011/093764  
PCT Pub. Date: Aug. 4, 2011

(65) Prior Publication Data  
US 2012/0328370 A1    Dec. 27, 2012

Related U.S. Application Data

(60) Provisional application No. 61/324,512, filed on Apr. 15, 2010.

(30) Foreign Application Priority Data

Jan. 26, 2010    (SE) ........................................ 1000076

(51) Int. Cl.  
*E02F 5/10*    (2006.01)  
*E02F 5/12*    (2006.01)  
(Continued)

(52) U.S. Cl.  
CPC ................ *E02F 5/08* (2013.01); *E02F 3/188* (2013.01); *E02F 5/10* (2013.01); *E02F 5/101* (2013.01);  
(Continued)

(58) Field of Classification Search  
CPC ... E02F 5/106; E02F 3/188; E02F 5/08; E02F 5/101; E02F 5/145; E02F 7/02;  
(Continued)

(56) References Cited

U.S. PATENT DOCUMENTS

RE10,688  E  *  2/1886  Moscopoulos ................... 43/9.5  
1,457,594  A  *  6/1923  Neary ....................... E02F 3/60  
                                                        37/398

(Continued)

FOREIGN PATENT DOCUMENTS

CN        101614302 A      12/2009  
DE         1201441 B       9/1965  
(Continued)

OTHER PUBLICATIONS

International Search Report, International Application No. PCT/SE2011/000013, dated May 3, 2011, pp. 1-5.

(Continued)

*Primary Examiner* — Benjamin F Fiorello  
*Assistant Examiner* — Edwin J Toledo-Duran  
(74) *Attorney, Agent, or Firm* — Burr Forman McNair

(57) ABSTRACT

The present invention relates to a laying machine for laying at least one flexible casing or tube, cable or wire including: —a blade arrangement (2) for making a trench (5) in the ground, a consolidation and laying means (3) being arranged behind the blade arrangement (2), for clearing and safeguarding the trench (5) from collapsing while laying at least (Continued)

one flexible casing or tube, cable or wire into the trench. A blade assembly comprising compartments for cooling fluid.

25 Claims, 8 Drawing Sheets

(51) Int. Cl.
| | | |
|---|---|---|
| *E02F 5/08* | (2006.01) | |
| *E02F 3/18* | (2006.01) | |
| *E02F 5/14* | (2006.01) | |
| *E02F 7/02* | (2006.01) | |
| *H02G 1/06* | (2006.01) | |
| *E02F 9/00* | (2006.01) | |
| *F16L 1/032* | (2006.01) | |
| *F16L 1/028* | (2006.01) | |

(52) U.S. Cl.
CPC ............ *E02F 5/12* (2013.01); *E02F 5/145* (2013.01); *E02F 7/02* (2013.01); *E02F 9/00* (2013.01); *F16L 1/028* (2013.01); *F16L 1/032* (2013.01); *H02G 1/06* (2013.01)

(58) Field of Classification Search
CPC ..... E02F 9/00; E02F 5/10; E02F 5/102; E02F 5/103; E02F 5/12; H02G 1/06; H02G 9/02; F16L 1/00; F16L 1/024; F16L 1/12; F16L 1/032; F16L 1/028; G02B 6/504; G02B 6/502; E02D 17/06; E02D 17/086; E02D 17/10; E21D 9/005
USPC .... 405/157, 164, 178, 179, 180, 174–184.4; 125/12–22; 451/540–558
See application file for complete search history.

(56) References Cited

U.S. PATENT DOCUMENTS

| | | | | | |
|---|---|---|---|---|---|
| 1,498,162 | A | * | 6/1924 | Gillespie | E02F 3/60 172/247 |
| 1,579,566 | A | * | 4/1926 | Packer | E02F 3/60 37/396 |
| 1,580,673 | A | * | 4/1926 | Page | E02F 3/60 37/396 |
| 1,644,252 | A | * | 10/1927 | Housman | E02F 3/60 172/26.6 |
| 1,693,353 | A | * | 11/1928 | Slavin | E02F 3/52 172/26.6 |
| 1,695,480 | A | * | 12/1928 | Buoy | E02F 3/60 37/396 |
| 1,703,546 | A | * | 2/1929 | Roe | E02F 3/52 37/394 |
| 1,749,741 | A | * | 3/1930 | Green | E02F 3/60 172/26.6 |
| 1,777,626 | A | * | 10/1930 | Rayburn | E02F 3/60 37/398 |
| 1,850,767 | A | * | 3/1932 | Page | E02F 3/60 24/136 R |
| 1,882,147 | A | * | 10/1932 | Humphreys | E02F 3/60 37/399 |
| 1,903,399 | A | * | 4/1933 | Wait | E02F 3/52 37/400 |
| 1,913,425 | A | * | 6/1933 | Black | A01K 75/06 43/9.7 |
| 1,917,492 | A | * | 7/1933 | Brendlin | E02F 3/60 37/396 |
| 1,933,759 | A | * | 11/1933 | Ratkowski | E02F 3/60 37/399 |
| 1,951,909 | A | * | 3/1934 | Hayward | E02F 3/60 37/396 |
| 1,979,738 | A | * | 11/1934 | Gibson | E02F 3/60 37/398 |
| 1,989,334 | A | * | 1/1935 | Page | E02F 3/60 37/398 |
| 2,032,851 | A | * | 3/1936 | Page | E02F 3/60 37/399 |
| 2,066,519 | A | * | 1/1937 | Clark | A01K 73/045 43/9.7 |
| 2,146,663 | A | * | 2/1939 | Vaughn | F16C 33/3818 37/394 |
| 2,261,233 | A | * | 11/1941 | Dausman | E02F 3/60 37/398 |
| 2,325,336 | A | * | 7/1943 | Mikan | E02F 3/60 37/398 |
| 2,338,831 | A | * | 1/1944 | Whitcomb | E02F 3/60 37/398 |
| 2,365,441 | A | * | 12/1944 | Smith | B65D 88/26 294/68.21 |
| 2,372,800 | A | * | 4/1945 | Stearns | F17C 1/08 220/560.06 |
| 2,391,876 | A | * | 1/1946 | Brown | A01J 9/04 165/156 |
| 2,401,625 | A | * | 6/1946 | Eger | B64D 37/06 156/191 |
| 2,414,994 | A | * | 1/1947 | Wright | E02F 5/003 37/367 |
| 2,592,419 | A | * | 4/1952 | Harper | B65D 85/84 220/4.17 |
| 2,688,817 | A | * | 9/1954 | Brune | A01K 69/06 114/255 |
| 2,721,411 | A | * | 10/1955 | Pedersen | A01K 73/00 43/9.1 |
| 2,795,883 | A | * | 6/1957 | Ras | A01K 79/02 43/17.1 |
| 2,807,256 | A | * | 9/1957 | Woolley | B23D 59/025 125/13.01 |
| 2,890,543 | A | * | 6/1959 | Mitchell | A01K 73/02 43/9.1 |
| 2,909,134 | A | * | 10/1959 | Kniefel | E02F 5/102 193/38 |
| 3,022,765 | A | * | 2/1962 | Xenis | B05C 7/02 118/306 |
| 3,023,551 | A | * | 3/1962 | Osenberg | B24D 5/066 125/15 |
| 3,156,996 | A | * | 11/1964 | Luketa | A01K 73/02 43/9.1 |
| 3,195,261 | A | * | 7/1965 | Luketa | A01K 73/02 43/9.3 |
| 3,232,358 | A | * | 2/1966 | Heiberg | E02F 3/961 172/477 |
| 3,282,263 | A | * | 11/1966 | Christensen | B23D 59/025 125/15 |
| 3,286,476 | A | * | 11/1966 | MacLay | E02F 5/102 172/239 |
| 3,292,379 | A | * | 12/1966 | McElvany | E02F 5/10 405/179 |
| 3,313,115 | A | * | 4/1967 | Kniefel | E02F 5/102 405/180 |
| 3,339,368 | A | * | 9/1967 | Ezoe | E02F 5/104 405/164 |
| 3,366,969 | A | * | 1/1968 | Luketa | A01K 73/10 43/9.3 |
| 3,422,631 | A | * | 1/1969 | Silverman | E02F 5/102 15/104.061 |
| 3,435,793 | A | * | 4/1969 | Shurtleff | B65D 88/78 114/257 |
| 3,508,411 | A | * | 4/1970 | Rogers | A01B 13/08 172/40 |
| 3,514,960 | A | * | 6/1970 | Howard | A01B 11/00 172/40 |
| 3,551,983 | A | * | 1/1971 | Newbury | F16L 3/18 228/49.3 |
| 3,561,222 | A | * | 2/1971 | Sweeton et al. | E02F 5/102 37/370 |
| 3,585,804 | A | * | 6/1971 | Sramek | A01B 13/00 405/183 |
| 3,608,217 | A | * | 9/1971 | Voisin, Sr. | A01K 80/00 294/68.26 |

(56) References Cited

U.S. PATENT DOCUMENTS

| | | | | |
|---|---|---|---|---|
| 3,618,237 A * | 11/1971 | Davis | E02F 5/103 | 172/40 |
| 3,635,036 A * | 1/1972 | Hooper, Jr. | E21B 7/046 | 405/170 |
| 3,664,137 A * | 5/1972 | Lett | E02F 5/10 | 405/179 |
| 3,668,879 A * | 6/1972 | Ogle | E02F 5/102 | 405/180 |
| 3,702,062 A * | 11/1972 | Olson | E02F 5/103 | 172/40 |
| 3,713,300 A | 1/1973 | Ward | | |
| 3,727,332 A * | 4/1973 | Zimmer | E02F 3/18 | 172/4.5 |
| 3,750,451 A * | 8/1973 | Nolan, Jr. | F16L 1/23 | 269/48.1 |
| 3,874,182 A * | 4/1975 | Potter | E02F 5/12 | 405/179 |
| 3,903,931 A * | 9/1975 | Moulin | F16J 15/46 | 138/117 |
| 3,914,948 A * | 10/1975 | Kaercher, Jr. | E02F 5/103 | 172/40 |
| 3,927,164 A * | 12/1975 | Shimabukuro | B29D 23/001 | 156/247 |
| 3,998,065 A * | 12/1976 | Darnell | E02F 5/102 | 405/179 |
| 4,014,175 A * | 3/1977 | Brink | E02F 5/102 | 37/370 |
| 4,022,182 A | 5/1977 | Lenkevich | | |
| 4,038,828 A * | 8/1977 | Schuck | E02F 5/103 | 37/370 |
| 4,089,131 A * | 5/1978 | Phillips | A01K 80/00 | 285/260 |
| 4,218,158 A * | 8/1980 | Tesson | F16L 1/26 | 405/170 |
| 4,318,641 A * | 3/1982 | Hogervorst | B63B 21/27 | 114/296 |
| 4,326,347 A | 4/1982 | Ballinger | | |
| 4,329,794 A * | 5/1982 | Rogers | E02F 3/60 | 37/398 |
| 4,399,629 A * | 8/1983 | Duncan | A01K 80/00 | 43/4 |
| 4,458,605 A * | 7/1984 | Herring, Jr. | B61F 5/34 | 105/197.05 |
| 4,461,598 A * | 7/1984 | Flechs | E02F 5/102 | 111/165 |
| 4,503,630 A * | 3/1985 | Riley | E02F 3/20 | 172/112 |
| 4,504,171 A * | 3/1985 | Florence, Jr. | F16L 55/18 | 138/97 |
| 4,542,940 A * | 9/1985 | Marten | E02F 3/188 | 173/8 |
| 4,563,929 A * | 1/1986 | Ringlee | A01G 23/091 | 144/241 |
| 4,653,362 A * | 3/1987 | Gerber | B26D 7/08 | 219/221 |
| 4,714,381 A * | 12/1987 | Hatch | E02F 5/104 | 405/175 |
| 4,720,211 A * | 1/1988 | Streatfield | E21B 7/30 | 138/97 |
| 4,776,370 A * | 10/1988 | Long, Jr. | F16L 55/1651 | 138/109 |
| 4,806,043 A | 2/1989 | Fournier | | |
| 4,812,078 A | 3/1989 | Rivard | | |
| 4,825,569 A | 5/1989 | Porter | | |
| 4,877,355 A * | 10/1989 | Van Pelt | E02F 5/104 | 405/159 |
| 4,927,294 A | 5/1990 | Magnani et al. | | |
| 4,944,872 A * | 7/1990 | Kantor | B63B 35/44 | 210/170.05 |
| 4,965,955 A * | 10/1990 | Campbell | A01K 63/02 | 119/201 |
| 4,981,396 A * | 1/1991 | Albertson | E02F 5/06 | 37/142.5 |
| 5,027,534 A * | 7/1991 | Sackett | A01D 34/86 | 37/189 |
| 5,039,252 A | 8/1991 | Schuermann | | |
| 5,106,440 A * | 4/1992 | Tangeman | B29C 63/28 | 156/156 |
| 5,167,215 A * | 12/1992 | Harding, Jr. | B23D 59/006 | 125/13.01 |
| 5,173,009 A * | 12/1992 | Moriarty | E21B 7/30 | 138/97 |
| 5,174,686 A | 12/1992 | Raymond | | |
| 5,197,453 A * | 3/1993 | Messina | B23D 61/021 | 125/15 |
| 5,214,868 A | 6/1993 | Persbacker | | |
| 5,265,647 A * | 11/1993 | Taylor | F16L 55/18 | 118/DIG. 11 |
| 5,285,484 A * | 2/1994 | Shibanuma | G21B 1/25 | 376/146 |
| 5,303,688 A * | 4/1994 | Chiuminatta | B23D 61/025 | 125/15 |
| 5,320,451 A | 6/1994 | Garvey | | |
| 5,343,641 A * | 9/1994 | Gregory | E02F 3/60 | 37/396 |
| 5,358,358 A * | 10/1994 | Tassone | F16L 11/22 | 138/111 |
| 5,361,528 A * | 11/1994 | Peacock | A01K 73/02 | 43/6.5 |
| 5,385,752 A * | 1/1995 | Steele | B05B 9/03 | 427/140 |
| 5,494,374 A * | 2/1996 | Youngs | F16L 9/18 | 405/129.45 |
| 5,515,624 A * | 5/1996 | Beatty | E02F 3/60 | 37/316 |
| 5,626,438 A * | 5/1997 | Etheridge | B08B 9/023 | 15/104.04 |
| 5,642,912 A * | 7/1997 | Parish, II | B66C 1/56 | 294/86.12 |
| 5,879,109 A | 3/1999 | Finzel et al. | | |
| 5,913,638 A * | 6/1999 | Lansdale | E02F 5/12 | 37/367 |
| 5,915,878 A * | 6/1999 | Carpenter | E02F 5/08 | 405/270 |
| 5,915,886 A * | 6/1999 | McNeil | E02D 29/12 | 156/287 |
| 5,975,804 A | 11/1999 | Bockman | | |
| 5,996,194 A * | 12/1999 | Redman | D06C 11/00 | 19/114 |
| 6,189,244 B1 * | 2/2001 | Johnson | E02F 5/06 | 37/349 |
| 6,299,382 B1 * | 10/2001 | Wentworth | B25B 27/023 | 29/426.5 |
| 6,305,880 B1 * | 10/2001 | Carter | B23D 21/02 | 175/53 |
| 6,371,691 B1 | 4/2002 | Finzel | | |
| 6,457,267 B1 | 10/2002 | Porter et al. | | |
| 6,551,028 B2 * | 4/2003 | Robinson | F16L 55/1658 | 175/53 |
| 6,585,453 B2 * | 7/2003 | Robinson | F16L 55/1658 | 175/19 |
| 6,592,299 B1 * | 7/2003 | Becker | E03B 3/06 | 405/210 |
| 6,637,978 B1 * | 10/2003 | Genta | E02F 5/08 | 405/174 |
| 6,718,660 B2 * | 4/2004 | Rivard | E02F 3/8825 | 299/39.8 |
| 6,718,900 B2 * | 4/2004 | Carter | B63B 7/06 | 114/257 |
| 6,769,423 B1 * | 8/2004 | Zhang | B28D 1/048 | 125/13.01 |
| 6,807,355 B2 | 10/2004 | Dofher | | |
| 6,821,054 B2 * | 11/2004 | Ballard | E02F 5/04 | 37/307 |
| 6,837,654 B2 | 1/2005 | Serrano | | |
| 6,846,029 B1 * | 1/2005 | Ragner | B25B 9/00 | 294/219 |

(56) References Cited

U.S. PATENT DOCUMENTS

| | | |
|---|---|---|
| 6,915,754 B2 * | 7/2005 | Tsuyoshi Komura ................... B63B 21/20 114/293 |
| 6,954,999 B1 | 10/2005 | Richardson et al. |
| 7,050,683 B2 | 5/2006 | Dofher |
| 7,293,375 B2 * | 11/2007 | Fukushima ............... E02F 9/02 180/311 |
| 7,351,009 B2 | 4/2008 | Serrano et al. |
| 7,390,142 B2 * | 6/2008 | O'Brien ............... B65D 90/105 220/567.1 |
| 7,524,142 B2 | 4/2009 | Scott |
| 7,685,762 B2 * | 3/2010 | Parsons ................. A01K 73/02 43/9.1 |
| 8,480,332 B2 * | 7/2013 | Miller .................. E02F 3/8816 405/154.1 |
| 2003/0123824 A1 | 7/2003 | Tatarka et al. |
| 2005/0074293 A1 * | 4/2005 | Searby ................... E02F 5/08 405/180 |
| 2005/0121017 A1 * | 6/2005 | Koike .................. B23D 61/025 125/15 |
| 2006/0039758 A1 * | 2/2006 | Leverette ............. B63B 21/502 405/223.1 |
| 2006/0056917 A1 | 3/2006 | McCormick |
| 2006/0288991 A1 * | 12/2006 | Baratta ................ B23D 59/025 125/13.01 |
| 2007/0286681 A1 * | 12/2007 | Parent .................... E02F 5/101 405/174 |
| 2008/0060631 A1 | 3/2008 | Dofher |
| 2009/0263195 A1 * | 10/2009 | Horan .................. E02F 3/3414 405/180 |
| 2010/0011628 A1 | 1/2010 | Hall et al. |
| 2012/0328370 A1 | 12/2012 | Gustafsson et al. |
| 2013/0294839 A1 | 11/2013 | Gustavsson et al. |

FOREIGN PATENT DOCUMENTS

| | | |
|---|---|---|
| DE | 1427699 A1 | 7/1971 |
| DE | 2529285 A1 | 1/1977 |
| DE | 3708360 A1 * | 9/1988 ............ B23D 59/02 |
| EP | 1334790 A2 | 8/2003 |
| EP | 1338495 A2 | 8/2003 |
| EP | 1903362 A1 | 3/2008 |
| FR | 2118025 A1 | 7/1972 |
| FR | 2305872 A1 | 10/1976 |
| FR | 2641297 A1 | 7/1990 |
| GB | 1226958 A | 3/1971 |
| GB | 2031049 A | 4/1980 |
| JP | S5138696 U | 3/1976 |
| JP | S57115514 U | 7/1982 |
| JP | S61152064 U | 9/1986 |
| JP | H072554 U | 1/1995 |
| JP | H10156727 A | 6/1998 |
| JP | 2002084615 A | 3/2002 |
| SU | 687194 A1 | 9/1979 |
| WO | 8900928 A1 | 2/1989 |
| WO | 9935346 A1 | 7/1999 |
| WO | 00/63500 A1 | 10/2000 |
| WO | 2004007223 A1 | 1/2004 |
| WO | 2005008307 A2 | 1/2005 |
| WO | 2006096921 A1 | 9/2006 |
| WO | 2007071065 A1 | 6/2007 |
| WO | 2008134848 A1 | 11/2008 |
| WO | 2011093764 A1 | 8/2011 |
| WO | 2012002657 A2 | 1/2012 |
| WO | 2012064271 A1 | 5/2012 |
| WO | 2012102659 A1 | 8/2012 |

OTHER PUBLICATIONS

Written Opinion, International Application No. PCT/SE2011/000013, dated Dec. 28, 2011, pp. 1-10.
International Search Report and Written Opinion for International Application No. PCT/SE2011/050958, dated May 7, 2012.
International Preliminary Report on Patentability for International Application No. PCT/SE2011/000013, dated May 24, 2012.
International Search Report and Written Opinion for International Application No. PCT/SE2012/000007, dated May 28, 2012.
International Preliminary Report on Patentability for International Application No. PCT/SE2012/000007, dated May 20, 2013.
International Preliminary Report on Patentability for International Application No. PCT/SE2011/050958, dated Jul. 30, 2013.

* cited by examiner

LAYING MACHINE

CROSS-REFERENCE TO RELATED APPLICATIONS

This application is a national stage entry of PCT/SE2011/000013, which was filed on Jan. 26, 2011, which claims priority to SE 1000076-8 filed on Jan. 26, 2010 and U.S. Provisional Application 61/324,512 filed on Apr. 15, 2010, each of said applications are expressly incorporated herein in their entireties.

BACKGROUND

Several kinds of machine for laying cable, pipes, or the like have been proposed. U.S. Pat. No. 5,214,868, U.S. Pat. No. 5,320,451, U.S. Pat. No. 6,189,244, U.S. Pat. No. 4,326,347, EP 1,058,757, U.S. Pat. No. 6,371,691 and U.S. Pat. No. 6,637,978 are examples of such machines.

U.S. Pat. No. 6,637,978 shows a working machine for laying cable, pipes, or the like. The machine includes an excavation means, a laying means for laying a wire in the excavation and a consolidation means in an intermediate position between the excavation means and the laying means. The width of the excavation being between 5 and 7 cm and the depth between 25 and 50 cm.

OBJECT OF THE INVENTION

An object of the invention is to provide a laying machine that can make a trench and lay at least one flexible casing or tube, cable or wire in the trench in a cost efficient manner.

Another object is to make as little impact on the environment as possible.

SUMMARY OF THE INVENTION

At least one of the objects above is at least partially enabled by a laying machine for laying at least one flexible casing or tube, cable or wire including a blade arrangement for making a trench in the ground, a consolidation and laying means being arranged behind the blade, for clearing and safeguarding the trench from collapsing while laying at least one flexible casing or tube, cable or wire into the trench. Having a blade arrangement to cut a trench provides a narrow trench which requires less energy to make than a wider one. Furthermore, the narrow trench make less damage on e.g. a road and therefore provides less environmental impact than a wider one. Furthermore it can much easier be covered and made almost invisible as if no trenching had been performed. Furthermore using a blade arrangement in a cutting operation makes the side walls of the trench less likely to collapse, since larger stones or roots are cut through. Furthermore the material from the trench when using a blade arrangement becomes a fine dust which can be easily collected by a dust collector.

A blade arrangement in the form of a blade assembly for working on a work surface/area/structure is also suggested. The blade assembly including at least two blades, a first blade, a second blade, and possible a third blade, that are axially aligned, each blade having a working portion at the periphery of the blade and a central portion around the axial center of the blade for being operated on by a device for driving the blade assembly, a blade support structure extending between the working portion and the central portion characterized in that the blades are spaced apart by a spacer structure/s, said spacer structure/s forming at least one compartment, between the blades, that is in contact with the central portion and extending towards the working portion, and at least at one radius of the spacer structure/s covering a significant part of the periphery at that radius of the spacer structure/s, said compartment/s having an inlet at the central portion.

Preferably the blade assembly includes three blades which are spaced apart by two spacer structures, said spacer structures each forming at least one compartment between the blades in contact with the central portion and extending towards the working portion and at least at one radius of the spacer structures covering a significant part of the periphery at that radius of the spacer structures, said compartment/s having an inlet at the central portion.

Preferably the significant part is at least 30%, preferably at least 50%, more preferably at least 70% of the periphery.

DESCRIPTION OF THE INVENTION

Figure 1:
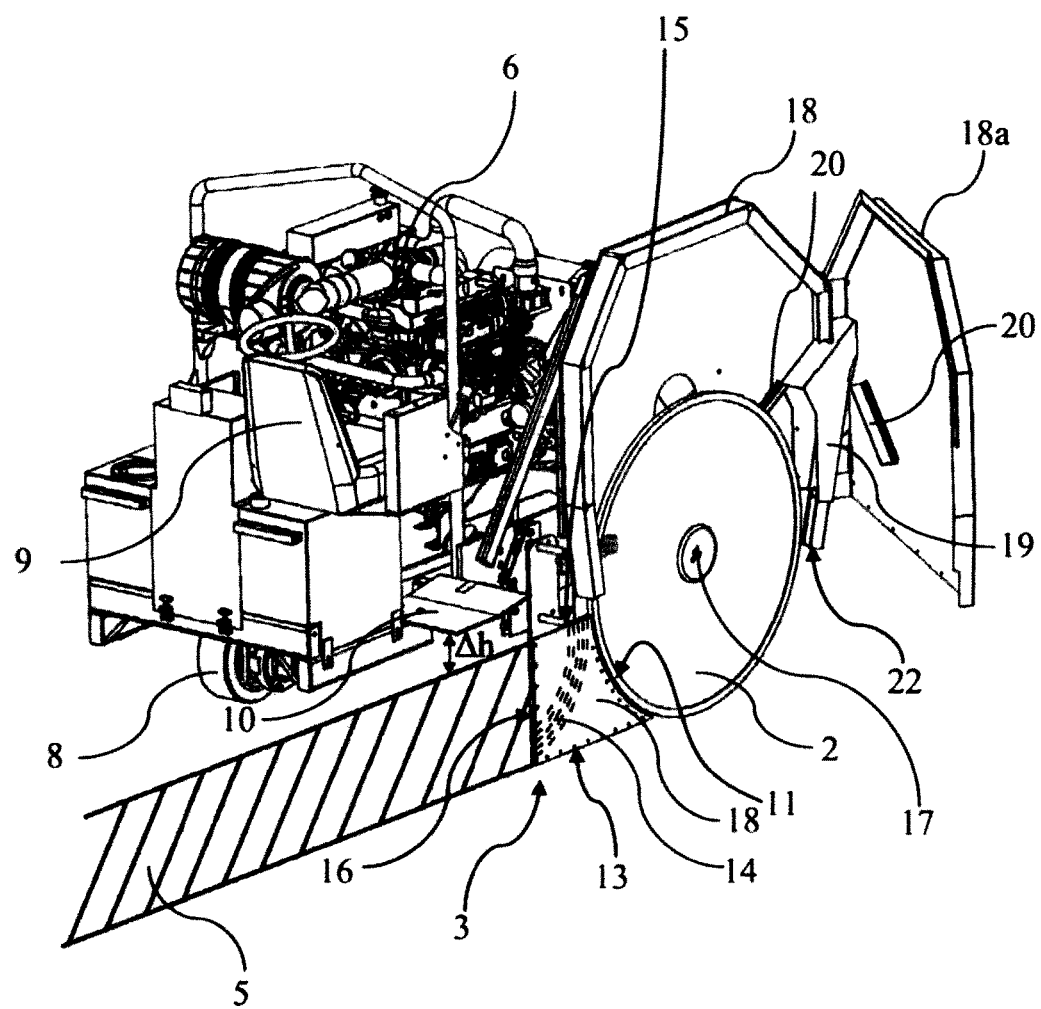
FIG. 1 is a rear perspective view of the laying machine.
Figure 2:
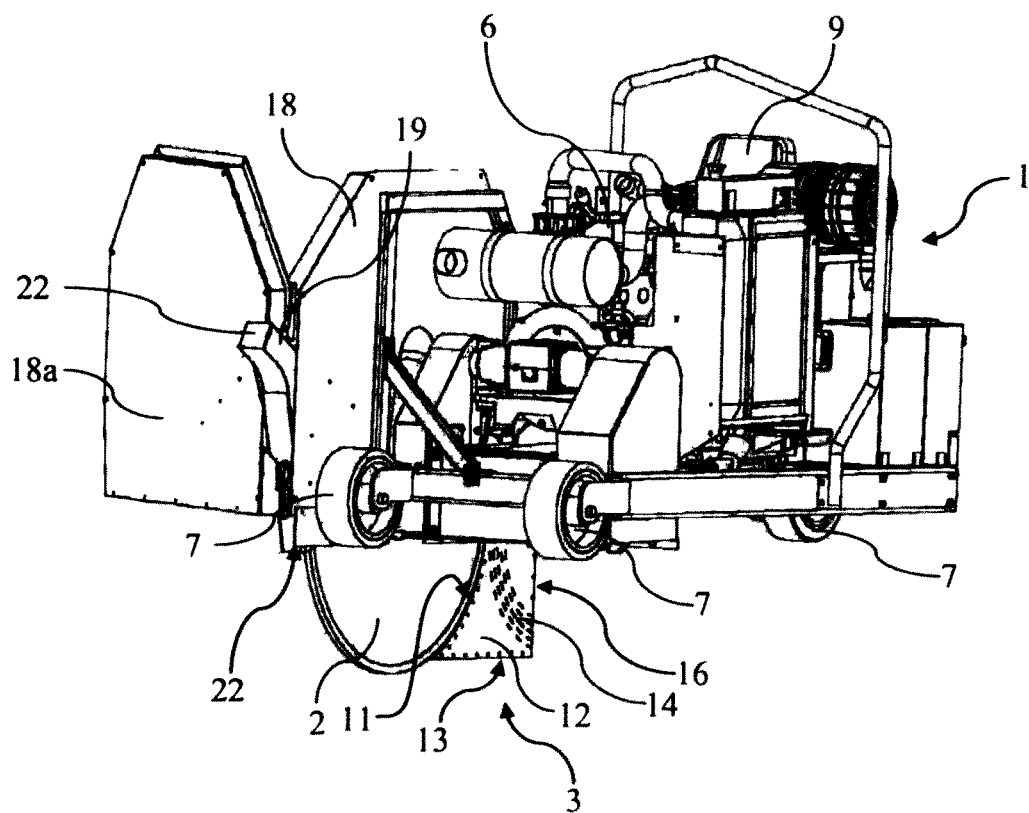
FIG. 2 is a front perspective view of the laying machine.
Figure 3:
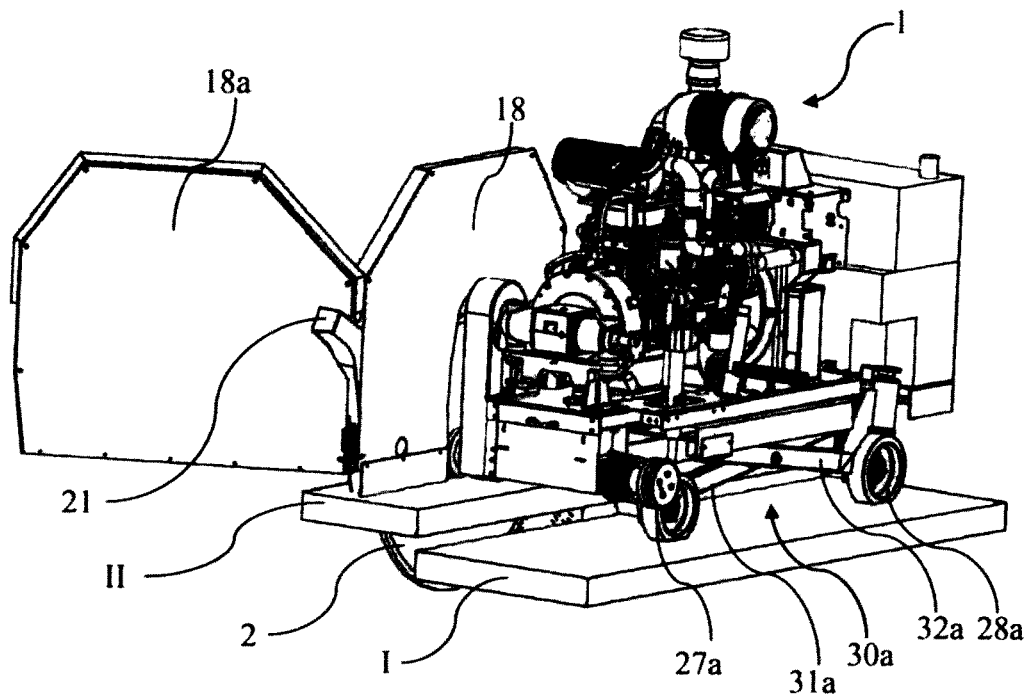
FIG. 3 is a front perspective view of a laying machine being able to operate at different ground levels.
Figure 4:
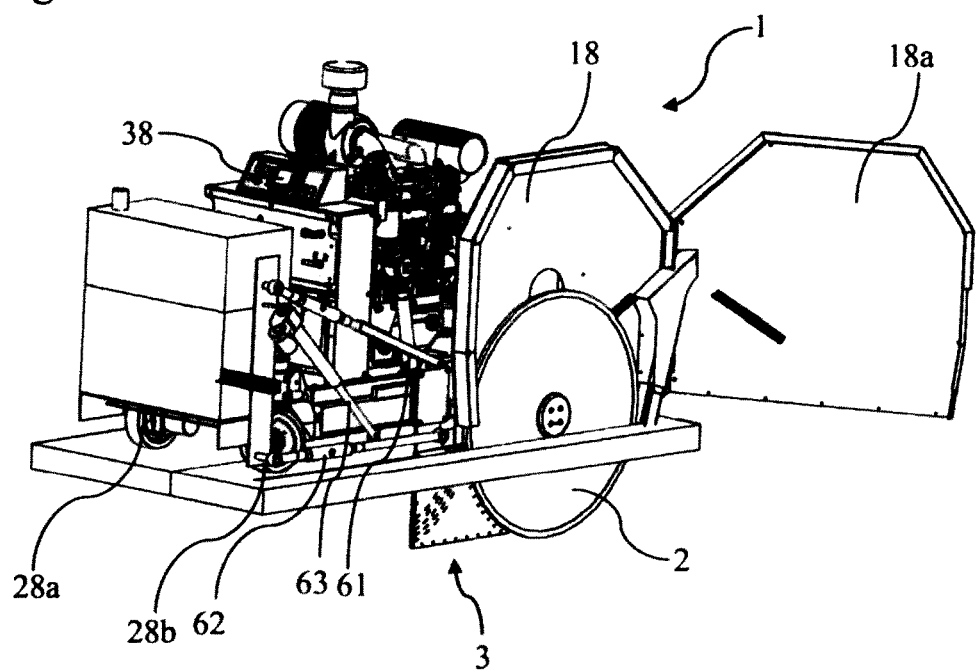
FIG. 4 is a rear perspective view of a laying machine being able to operate at different ground levels.
Figure 8:
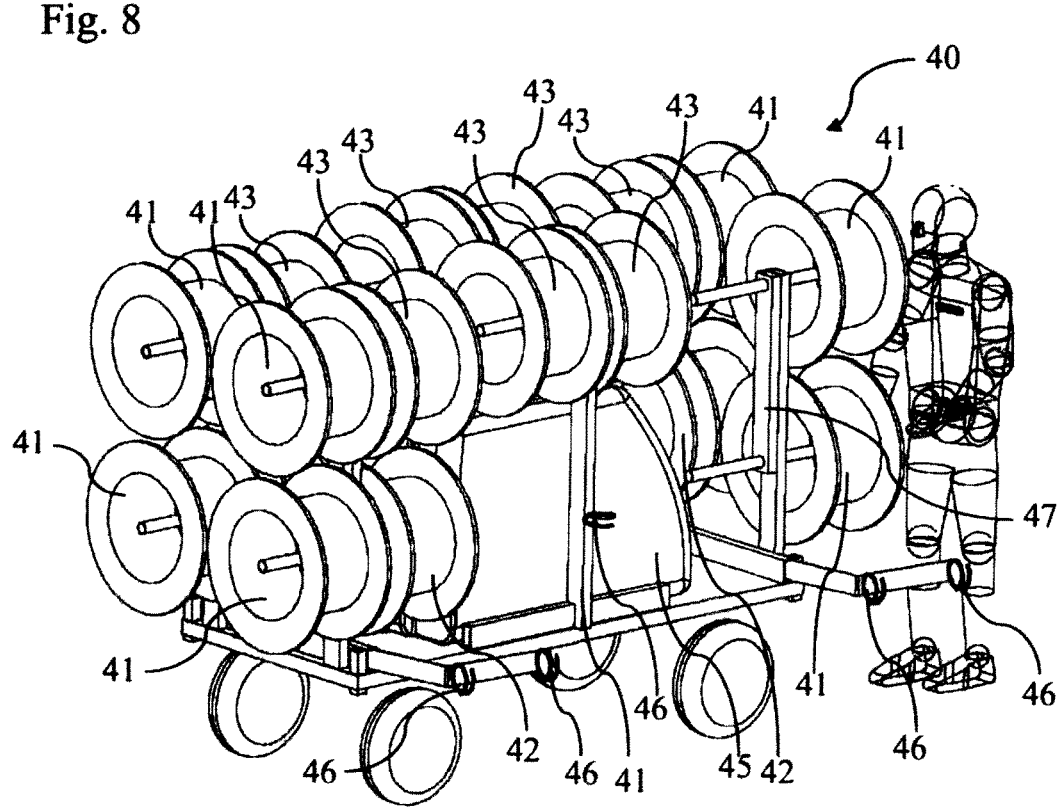
FIG. 8 is a reel carriage which for supplying flexible casings or tubes, cables or wires to the laying machine.

FIG. 1-2 shows a laying machine 1 according to one embodiment and FIG. 3-4 show the laying machine 1 according to another embodiment. The laying machine 1 includes a blade arrangement 2 for making a trench 5 in the ground and a consolidation and laying means 3 for clearing and safeguarding the trench 5 from collapsing while laying at least one flexible casing or tube, cable or wire into the trench 5. The at least one flexible casing or tube, cable or wire can be rolled off from a reel/s mounted on the machine 1 or as shown in FIG. 8 from reels arranged on a reel trailer 40. A disc guard 18 covers the portion of the blade arrangement 2 that is above ground level.

The machine 1 shown in FIG. 1-2 has two front wheels 7 and a rear wheel 8, while the machine shown in FIG. 3-4 has two front wheels 27a, 27b and two rear wheels 28a, 28b which are suspended by two scissor mechanisms 30a; 30b as is described in relation to FIG. 3-6. A motor 6 provides power to propel the machine 1 and to rotate the blade arrangement 2.

The blade arrangement 2, the disc guard 18, and the consolidation and laying means 3 are mounted at a first side of the machine 1, here shown as the right hand side of the machine 1. This enables the operator to place the trench 5 close to side structures such as walls. The blade arrangement 2 and the consolidation and laying means 3 can be moved from the first side of the machine to the opposite second side (i.e. the left hand side). When changing sides, the disc guard 18 is replaced by a corresponding disc guard having a mirrored configuration.

In the embodiment of FIG. 1-2 a seat 9 and feet support 10 are provided in the rear of the machine 1 straight behind the blade arrangement 2 so that a seated driver can drive the machine 1 while closely monitoring and controlling the trench making, consolidation and laying operation. In the shown embodiment the seat 9 and the feet support 10 protrudes somewhat more to the right than the blade arrangement 2 with the disc guard 18 and the consolidation and laying means 3, which will somewhat limit how close the machine 1 can make a trench 5 along a wall. However, it would of course be possible to have a driver seat 9 which does not protrude further than the blade arrangement 2 with the disc guard 18 and the consolidation and laying means 3. Such an embodiment may however reduce a seated operator's ability to visually monitor the trench making operation. The clearance Δh between the ground and the feet support 10 is suitable around 20-30 cm. This enables the machine 1 to go very close to lower side structures such as a pavement along a road. The laying machine 1 may also be arranged to be arranged to be controlled wireless so that the operator can choose between seated operation and remote controlled operation.

In the embodiment of FIGS. 3 and 4, the machine 1 is not equipped with and driver seat. In this embodiment the operator can operate the machine 1 by walking directly behind it accessing the control panel 38 and/or by using a remote control (not shown) for wireless control of the machine 1. In this embodiment the blade arrangement 2 with the disc guard 18 and the consolidation and laying means 3 are arranged as the outermost units of the first side of the machine 1, enabling the machine 1 to go very close also to higher side structures such as walls.

The machine preferably uses a hydraulic propulsion system powered by a diesel engine, however other kinds of propulsion system and motors 6 can be employed. The blade arrangement 2 is preferably driven by the same motor 6 that propels the machine 1 (the motor can e.g. be the same as used in the road saw model Husqvarna RS 8500 D or the floor saw model FS 9900 D). However, it would of course be possible to use separate motors for the blade arrangement 2 and the propulsion of the machine 1, as well as other motors types than those exemplified with.

The motor 6 drives a shaft 17 that connects to the centre of the blade arrangement 2. The shaft 17 with the blade arrangement 2 can be moved upwards and downwards to adjust the cutting depth of the trench 5. The raising and lowering of the shaft with the blade arrangement 2 is preferably powered by the hydraulic system (not shown) that is powered by the motor 6. In its most upward position the blade arrangement 2 is above ground level, i.e. it is in a transport position, and in its most downward position the shaft 17 holding the blade arrangement 2 is moved to a position close to the ground, e.g. only a few centimeters from ground level. The maximum trench depth can therefore be made almost as deep as the radius of the blade arrangement 2. Depending on how the machine 1 is configured, different blade diameters can be used; preferably the blade diameters are between 500-1200 mm. In one embodiment the blade arrangement 2 can be lowered or raised to any position between these extremes, i.e. the trench depth can thereby be varied. In another embodiment the machine 1 has one or several fixed operating depths.

The working portion, i.e. the active portion at the periphery of the blade arrangement 2, is between 5-50 mm thick, preferably 5-30 mm, more preferably 10-25 mm, most preferably 15-25 mm. Thereby a thin trench can be cut, which requires less work to make than a thicker one. The blade assembly 2 is preferably of a kind used for floor saws and road saws including one saw blade or an assembly of two or more saw blades, preferably two or three saw blades (see e.g. the embodiment described in relation to FIG. 11-14). The saw blade/s comprise steel plate/s that preferably has diamond-impregnated segments at the periphery (working portion) of the blade. Steel plates having diamond-impregnated segments at the periphery are for instance sold by Husqvarna AB.

As can be seen in FIG. 1 the disc guard 18 includes a hinged lid 18a that can be opened to access the blade arrangement 2. When closed the disc guard 18 has a width slightly larger than the width of the blade arrangement 2. In the preferred embodiments the blade arrangement 2 is arranged to rotate in an upcut direction, i.e. a rotational direction where the lowest portion of the blade arrangement 2 moves in the forward driving direction of the machine 1. Therefore, dust and any debris from the trench making, consolidation and laying operation will mainly exit the trench in front of the blade arrangement 2. To collect this dust and debris dust duct 19 is provided in the front section of the disc guard 2. The dust duct has an dust inlet 22 arranged close to the ground in front of the blade arrangement 2 for receiving dust from the upcut rotation of the blade arrangement 2, and a disc guard dust outlet 21 located above the disc guard dust inlet 22. An upper wall of the disc guard dust duct 19 is partly defined by a flexible sealing member 20 sealing towards the blade arrangement 2 and preventing dust from entering the upper volume of the disc guard 18. The sealing member 20 could e.g. be two rubber strips or two brushes.

A dust collector 50; 500 (see FIGS. 7, 9, 10) can be connected to the disc guard dust outlet 21, to receive dust and debris from the trench making operation. The dust collector 50; 500 may include suction means (not shown) or other active means for conveying dust to a receiving compartment of the dust collector, for instance a screw conveyor 501 (see FIG. 10), or it may rely only on the rotational force from the rotating blade arrangement 2 (See FIG. 7). The dust collector 50; 500 can include any kind of container or a bulk bag (e.g. a Flexible Intermediate Bulk Container), that can be arranged on the machine 1 or on a separate wheeled unit.

Figure 7:
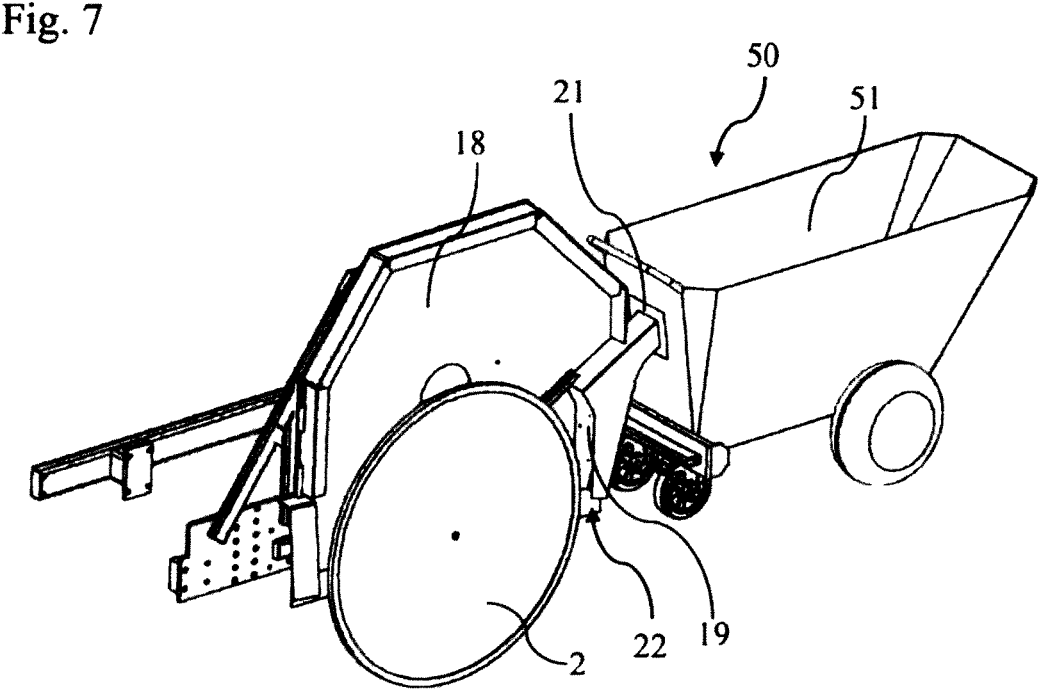
FIG. 7 is a perspective view of a wheeled dust collector being pushed by the laying machine.

In the embodiment shown in FIG. 7 the dust collector is a first wheeled unit 50 in front of the machine 1 that is pushed forward by the machine 1 as it propels. The first wheeled unit 50 of FIG. 7 has an inner compartment 51 which is preferably covered by a lid (not shown) during the trench making operation. The inner compartment 51 is connected to the dust outlet 21 via an opening to the inner compartment 51 at the rear side thereof. The dust duct 19 and the inner compartment 51 of the first wheeled unit 50 forms a substantially closed air system which optionally has an air filter for letting out air while keeping the dust in the compartment 51. If having an air filter it is preferably arranged on the lid (not shown). The first wheeled unit 50 is easily disconnected from the laying machine 1 so that moved away and emptied when filled.

Figure 9:
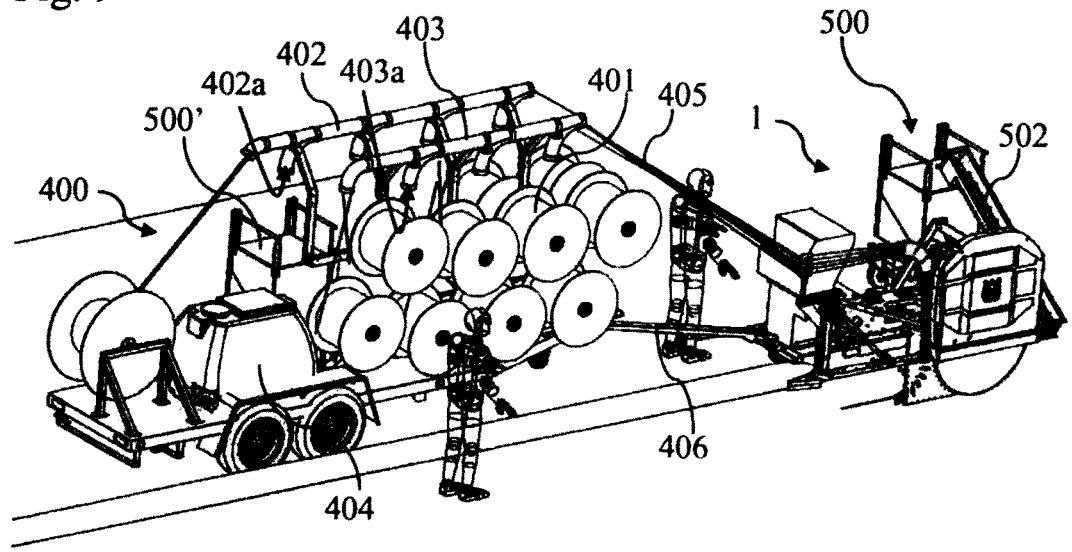
FIG. 9 shows laying machine in operation pulling a reel trailer that supplies flexible casings or tubes, cables or wires to the machine.
Figure 10:
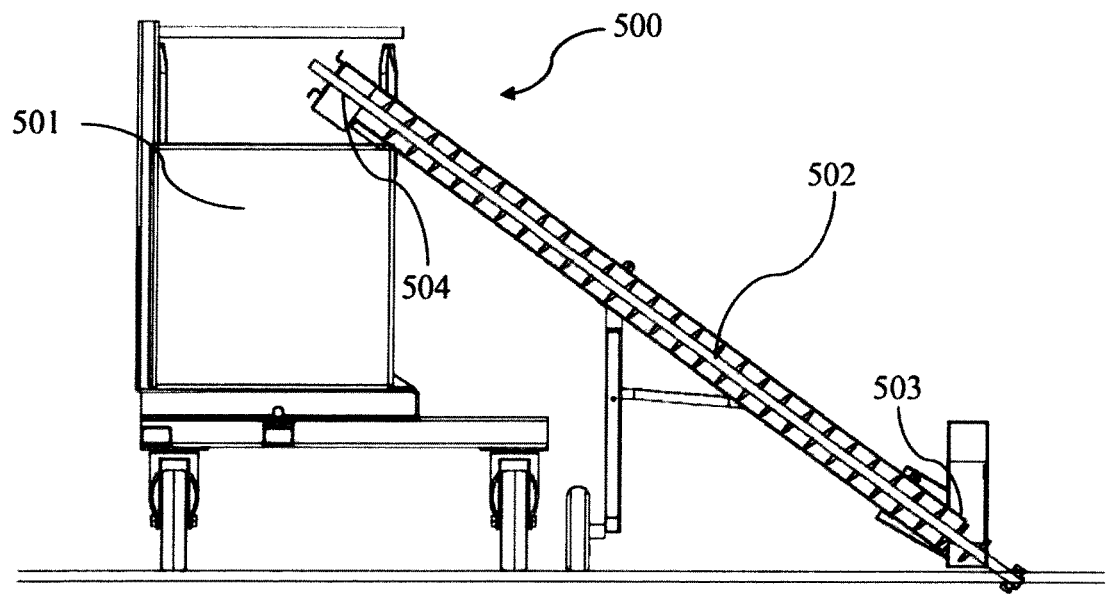
FIG. 10 shows schematically an embodiment of a dust collector.
Figure 11:
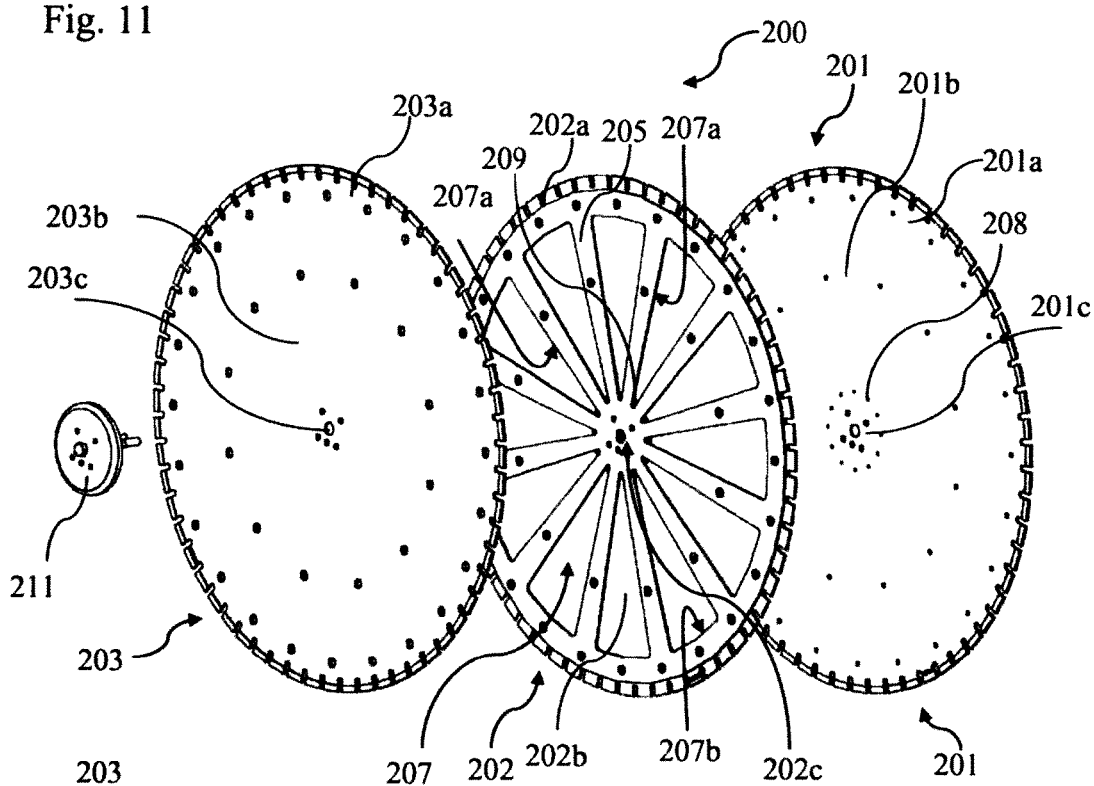
FIG. 11 shows a partial exploded view of a blade assembly having three blades as seen from the side opposite to where the drive shaft is connected.
Figure 12:
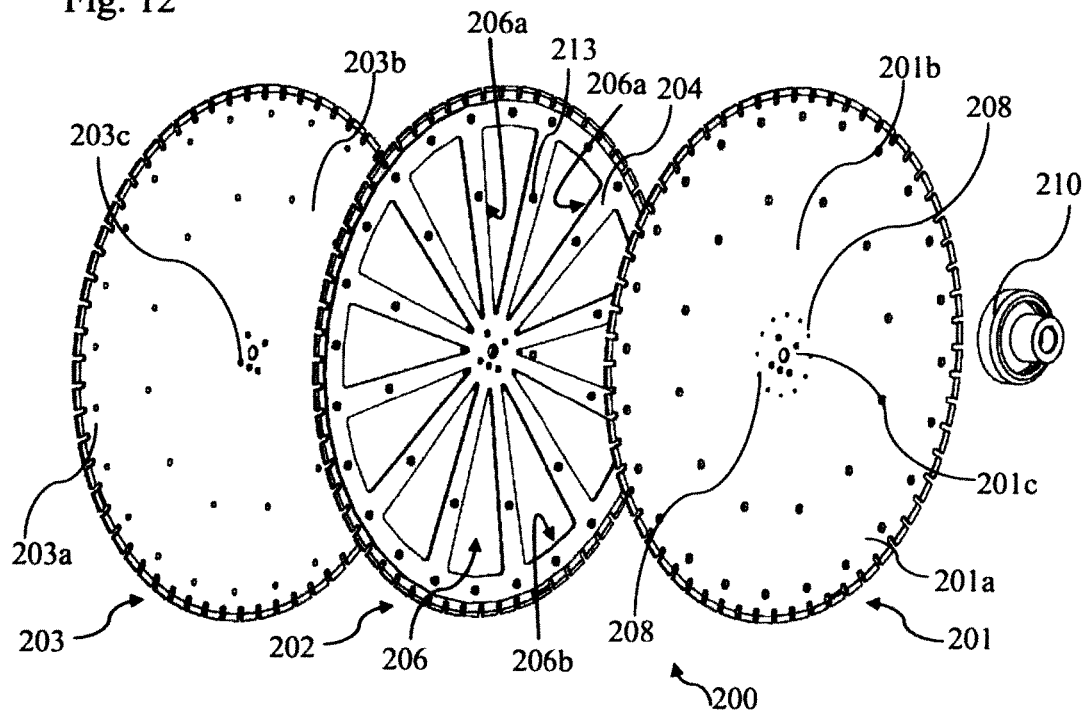
FIG. 12 shows a partial exploded view of a blade assembly having three blades as seen from the side where the drive shaft is connected.
Figure 13:
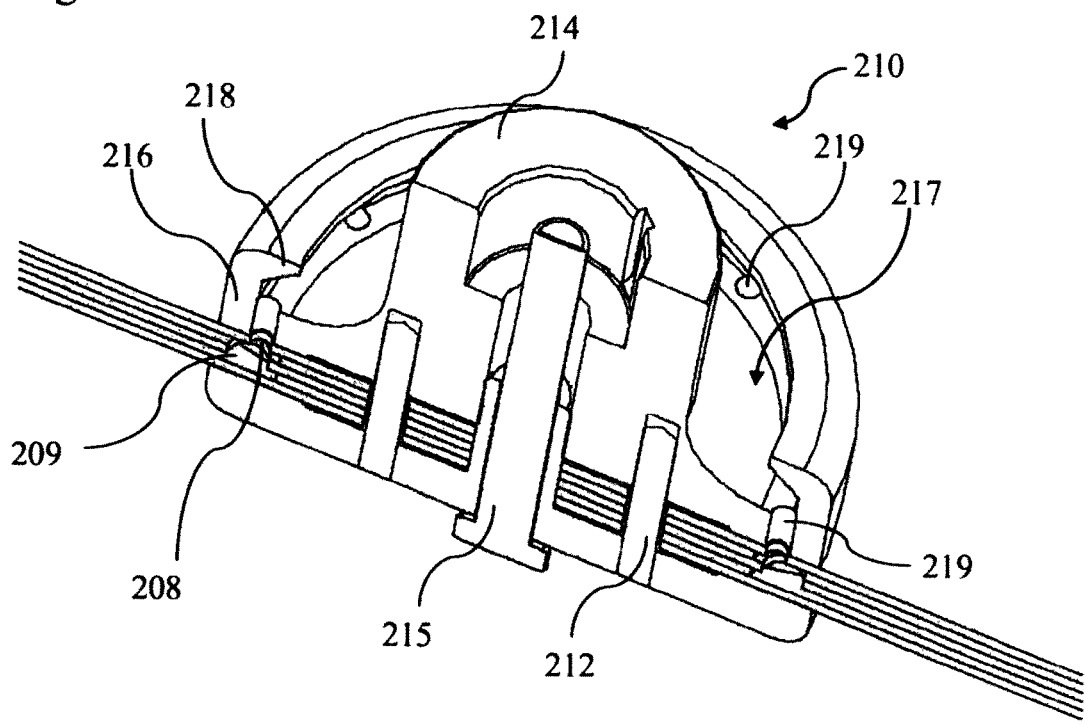
FIG. 13 shows a cross section of the central member clamping the blade assembly, providing a connection for the drive shaft and providing means for supplying fluid to compartments in the blade assembly.
Figure 14:
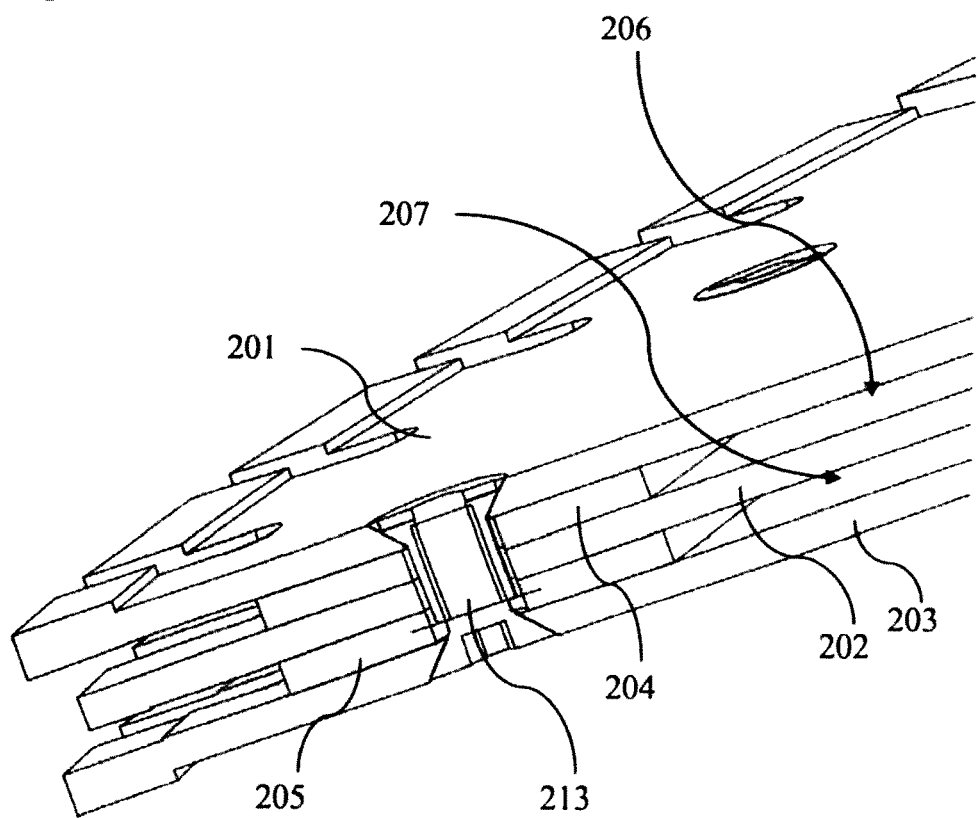
FIG. 14 shows a zoomed in part of a cross section of the blade assembly at the periphery thereof.

In FIGS. 9, 10 the dust collector 50; 500 is a second wheeled unit 500 that supports a bulk bag 501. Here the wheeled unit 500 is shown arranged at the left side of the machine, i.e. the side opposite to where the blade arrangement 2 is mounted. A screw conveyor 502 has a screw conveyor inlet 503, in a lower distal end thereof, which receives dust from an dust outlet in front of the disc guard 18, and conveys the dust to the screw conveyor outlet 504 at the opposite distal end of the screw conveyor 502 that supplies the bulk bag 501 with the conveyed dust. When a bulk bag is full, the second wheeled unit 500 can be replaced by another second wheeled unit 500', and/or the bag can be removed from the second wheeled unit 500 and optionally emptied at a suitable location. Even though the embodiment in FIGS. 9, 10 shows a screw conveyor 502 for conveying the dust to the bulk bag 501, other kinds of conveying means can be employed, for instance a belt conveyor.

In the embodiment of FIGS. 1 and 2 the consolidation and laying means 3 is manually put into the trench and secured at the operating depth. In this embodiment, when making a trench 5, the laying machine 1 first makes an initial trench with the blade arrangement 2. In this initial step the consolidation and laying means 3 is detached from the machine 1. When the initial trench 5 has been made the blade arrangement 2 is raised, and the consolidation and laying means 3 is inserted into the trench 5, preferably already supporting the at least one flexible casing or tube, wire or cable. Alternatively the at least one flexible casing or tube, wire or cable can be provided to the consolidation and laying means 3 while in the trench 5. Thereafter the consolidation and laying means 3 is secured to the laying machine 1 and the blade arrangement 2 is lowered to the operating depth.

In the embodiment shown in FIG. 4 it can be seen that the consolidation and laying means 3 is being held by two pivotable arms 61, 62. Each arm 61, 62 include a turnbuckle so that their respective length can be adjusted by turning the turnbuckles. Thereby the position of the consolidation and laying means 3 behind the blade arrangement 2 can be adjusted. Furthermore, the pivotable arms 61, 62 are so arranged that, when lifting the consolidation and laying means 3 up from the trench 5 while the disc blade arrangement 2 still is present therein, it follows a trajectory that prevents the consolidation and laying means 3 from intersecting with the blade arrangement 2 when being raised or lowered into the trench 5. An actuator 63 can be actuated to raise and lower the consolidation and laying means 3. The actuator 63 can e.g. be a hydraulic actuator connected to the hydraulic system of the machine 1 or an electric actuator. The operator can control the raising lowering of the consolidation and laying means 3 via the control panel 38 on the machine or via remote control (not shown).

When reaching the operating depth the concave front end 11 of the consolidation and laying means 3 is arranged to be located behind the blade arrangement 2, at a position so that the concave front end faces and follows the periphery of the blade arrangement 2 and so that the clearance between the front end 11 and the blade arrangement 2 is less than 50 mm within the trench 5. Preferably the clearance is less than 40 mm, more preferably less than 20 and most preferably less than 10 mm. In fact the clearance could even be zero the first time it is used letting the blade arrangement 2 work up a clearance. Of course as the blade arrangement 2 is worn the clearance may increase. The consolidation and laying means 3 could therefore be equipped with clearance adjusting means for adjusting it forwardly and backwardly to adjust the clearance between the front end 11 and the periphery of the blade arrangement 2.

Furthermore, when arranged behind blade arrangement 2, i.e. during the trench making, consolidation and laying operation, the lowest portion of the consolidation and laying means 3, i.e. its bottom 13, is arranged to be located above the lowest portion of the blade arrangement 2, preferably between 10-100 mm above, more preferably 10-60 mm, most preferably 20-50 mm. Preferably the bottom 13 is flat.

The side walls 12 of the consolidation and laying means 3 prevents the trench walls from partly or completely collapsing before the at least one flexible casing or tube, cable or wire is fed into the trench 5. The consolidation and laying means 3 further has one or more feeding ducts 14 that each has a inlet at an upper portion 15 of the consolidation and laying means 3 for receiving the flexible casing, cable or wire and a outlet at a rear end 16 of the consolidation and laying means 3 for feeding the cable or wire to the trench 5. Each feeding duct 14 can be arranged to guide one or more flexible casings or tubes, wires, or cables, preferably one flexible casing or tube. Thus the at least one feeding duct 14 can be one, e.g. feeding a larger flexible casing with room for multiple cables, or several tubes, wires or cables on top of each other. Preferably the feeding duct 14 is at least two, preferably at least four. The consolidation and laying means 3 is preferably made open or openable at the upper portion of and towards the rear end of the consolidation and laying means 3, so that the at least one flexible casing or tube, wire, or cable can be fed by pushing it down into the consolidation and laying means 3, i.e. this could be done while it is already in the trench 5. Another alternative is to push the at least one flexible casing or tube, wire, or cable through the inlet of the feeding duct 14 to the outlet of the feeding duct 14. A further option would be to have one of the side walls 12 of the consolidation and laying means 3 detachable, i.e. detaching it and putting the at least one flexible casing or tube, wire, or cable into the desired feeding duct 14.

In one embodiment the consolidation and laying means 3 have the same thickness or is no more than 1 mm thinner than the blade arrangement 2. The advantage with this embodiment is that both the blade arrangement 2 and the consolidation and laying means 3 can be made as thin as possible, i.e. as thin as the size of the flexible casing or tube, cable or wire allows.

Alternatively, the consolidation and laying means 3 is made thinner than the blade arrangement 2, preferably at least 1 mm thinner, more preferably at least 2 mm thinner, most preferably at least 5 mm thinner, even more preferred 10 mm thinner. One advantage of having the consolidation and laying means 3 thinner than the blade arrangement 2, is that if the trench 5 is not to be cut in a straight line but rather allowing for a curvature, the lesser thickness of the consolidation and laying means 3 reduces the risk for it to get stuck in the trench 5, i.e. the more thinner the consolidation and laying means 3 is in relation to the blade arrangement 2, the steeper curves can be done when making the trench 5.

The wire laying machine 1 could further include, a temperature sensor (not shown) for sensing the temperature of the blade arrangement 2, a coolant and/or consolidation liquid supply means (not shown) for supplying liquid to the blade arrangement 2, and means for regulating the amount of supplied liquid (not shown) to the blade arrangement 2 based on inputs from the temperature sensor. The coolant and/or consolidation liquid for either cooling the blade arrangement 2, or consolidating the trench 5 by wetting it thereby reducing risk of partly or entirely collapsing trench walls, or a combination of cooling the blade arrangement 2 and consolidating the trench 5.

Regarding the rotational direction of the disc, even though it is preferred to have upcut direction, the opposite would also be feasible. Of course then the dust inlet and outlet are suitably arranged at the rear end of the blade arrangement 2.

When laying fiber optic cables it is common to put out hollow tubes or flexible casings where the fiber optic cables are blown out using air pressure through already installed tubes and/or casings, i.e. after that the tubes and/or flexible casings have been put down in trenches and been covered.

The laying machine 1 may also include as GPS receiver which saves positional data which can be used in combination with digital maps to document the excavated trenches. Furthermore the laying machine may also include means for monitoring the cutting depth and to save this information in combination with the positional data. Also information about how many and which kind of flexible casings, tubes, cables or wires that have been laid down in the trenches. Thereby a full documentation can be provided about where the trenches have been excavated, how deep they are, and what kind and how many cables, wires etc that has been laid down in the trenches.

Figure 5:
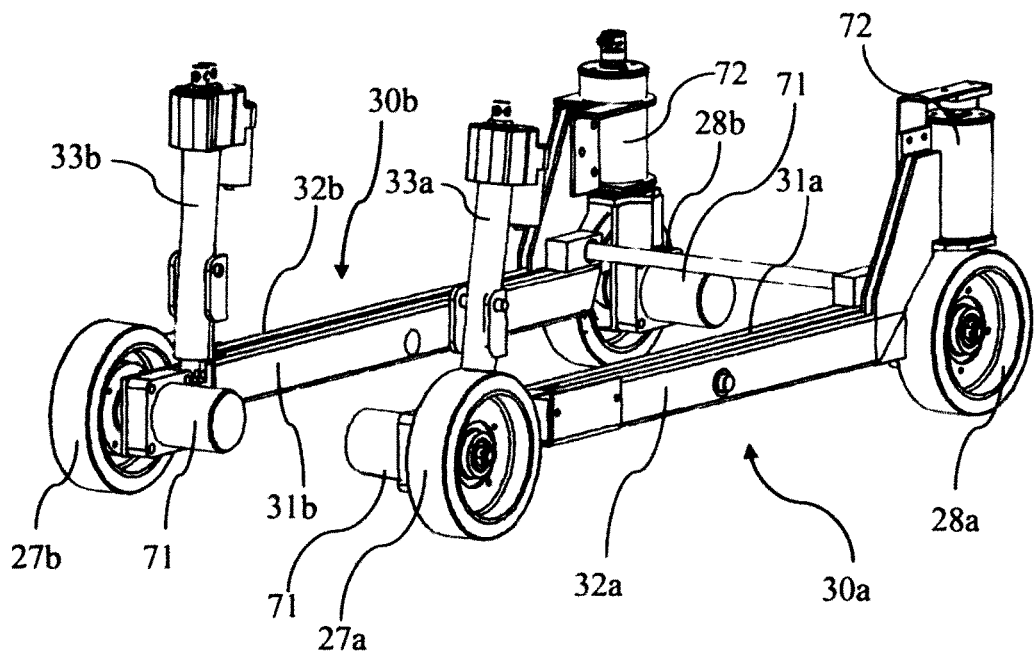
FIG. 5 shows scissor mechanisms used in the embodiments of FIGS. 3 and 4 when both are fully retracted.
Figure 6:
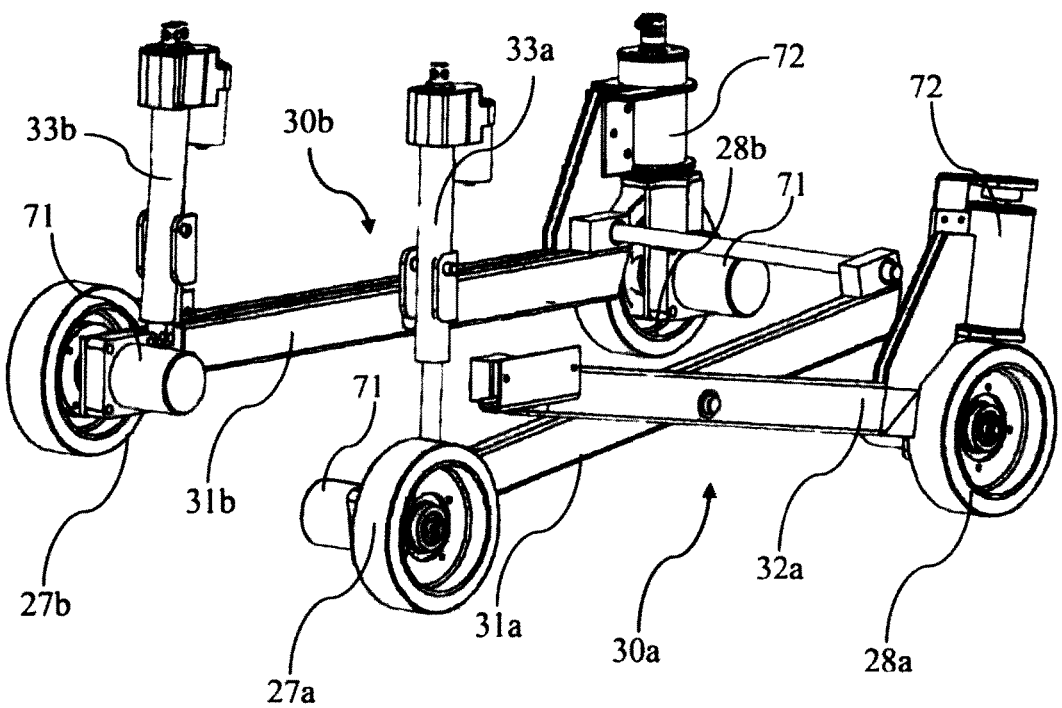
FIG. 6 shows the scissor mechanisms used in the embodiments of FIGS. 3 and 4 when the right one is retracted and the left one extended.

In FIG. 3-6 an embodiment is shown where the laying machine 1 has a left 27a, 28a and a right 27b, 28b wheel pair mounted to a scissor mechanism 30a; 30b of left and the right side of the machine 1. Respectively scissor mechanism 30a; 30b having a front scissor arm 31a; 31b for the front wheel 27a; 27b and a rear scissor arm 32a; 32b for the rear wheel 28a; 28b. The scissor mechanism is best seen in FIGS. 5 and 6. In FIG. 3, the laying machine 1 is shown with the left wheel pair 27a, 28a on a first ground level I, e.g. street level, and the second wheel pair 27b, 28b on a second elevated ground level II, e.g. a pavement. An actuator 33a; 33b actuates the front scissor arm 31a; 31b when extends or retracts the scissor mechanism 30a; 30b, and thereby raising or lowering the corresponding side of the machine 1, so that it can operate with the wheel pairs 27a, 28a; 27b, 28b on different ground levels while keeping the blade arrangement 2 vertical.

The actuators 33a; 33b are preferably hydraulically powdered cylinders that each are connected to a corresponding hydraulic scissor control valve (not shown). Of course, the actuators 33a; 33b can alternatively be electrical actuators. The laying machine 1 has a first level sensor (not shown) which measures the angle to horizontal in a sideways direction. The first level sensor is connected to an electronic control unit (not shown) that can be set to control the hydraulic scissor control valves (not shown) and thereby the scissor mechanisms 30a; 30b. Thereby the machine 1 can be automatically controlled to stay leveled in horizontal position, so that the blade arrangement 2 is kept vertical. The first level sensor may also provide leveling information to the operator.

In one embodiment the first level sensor can be calibrated. In this situation the operator uses a reference level sensor and inputs the results either manually using the control panel 38 or a remote control device or by connecting the reference sensor to the electronic control unit (i.e. via cable or wireless, for instance via an usb cable to the control panel). The reference senor may be connected to a computer running a calibrating software. A calibrating software may also be included in the electronic control unit.

In one embodiment the operator can choose to set one of the scissor mechanisms 30a; 30b in a fixed position. Thus in this situation the electronic control unit is adjusting the horizontal leveling by extending or retracting the opposite scissor mechanism 30b; 30a. Usually the scissor mechanism 30a; 30b on the side where the blade arrangement 2 is located is set in a fixed position. Thereby the cutting depth can be kept constant.

In addition the operator can choose to switch off the automatic leveling control and instead manually control one or both hydraulic scissor control valves. Of course, the machine could be arranged without an automatic leveling system relying only on manual control of the hydraulic scissor control valves.

By having the scissor mechanisms 30a; 30b, the flexibility of the laying machine 1 increases. The machine 1 can operate with one wheel pair 27a, 28a at one ground level I and the opposite wheel pair 27b, 28b on a different ground level II, for instance by having one of the wheel pairs on a pavement. Also the ground clearance of the machine can be adjusted, e.g. by extending/retracting both scissor mechanisms 30a; 30b. This can be advantageous if the ground is somewhat uneven, e.g. with stones sticking up. Furthermore if one wheel 27a, 27b, 28a, 28b encounters a bump or a small hole, both the consolidation and laying means 3 and the blade arrangement 2 can be kept from tilting left or right, by extending or retracting the scissor mechanisms 30a; 30b, i.e. minimizing the risk of them getting jammed in the trench.

In the embodiment shown in FIG. 3-6, the front wheels 27a, 27b and the rear wheels 28a, 28b are hydraulically driven. The rear wheels 28a, 28b can be jointly turned, up to 90 degrees by use of hydraulics, or be tuned individually, whereas the front wheels 27a, 27b in this embodiment are fixed from turning. Each rear wheel 28a, 28b have an angle sensor for determining the angular position of respectably rear wheel. The angular sensors can be individually calibrated by the operator. This calibrating feature can also allow manufacturing to have slightly less accuracy when mounting the sensors, since they can be calibrated after manufacture.

As mentioned above the machine can be operated from a control panel 38 on the machine 1 or by a remote control device. Each scissor mechanism can be individually extended or retracted. The machine 1 can be set for automatic leveling or manual leveling, with or without fixing one of the scissor mechanisms 30a; 30b in one position and adjusting the other. The rear wheels 28a, 28b can be turned individually or jointly. All these features provides for great flexibility.

The steering control of the machine 1 can at least be set in a transport mode or in a cutting mode. If the blade arrangement 2 is in an operating position in the trench 5, the steering control acts differently compared to when in the transport mode. For instance the angular position of the rear wheels are limited, e.g. +−10 degrees compared to +−90 degrees in transport mode. In transport mode the angular position of the wheels are proportional to the joystick or steering wheel position, i.e. the wheels will revert to 0 degrees if the joystick is released, whereas in cutting mode moving a joystick position gives inputs to slowly turn the wheel in one rotational direction, turning speed determined by how much the joystick position is offset (optionally the turning speed of the wheel is constant regardless of how much the joystick is offset). If the joystick is released the wheels stay in their latest position. In the cutting position the forward speed is also limited, for instance a full joystick offset could provide a speed that is only a third of the speed in transport mode. When raising the blade arrangement 2 from the trench 5, the steering control is kept in the cutting mode until it is deactivated. One advantage with this is that the blade arrangement 2 can be switched while keeping the wheels in the same position. This is very beneficial since normally the wheels are slightly turned in operating conditions, even if the machine 1 is intended to go straight forward. This is done to compensate for the forces that arises due to that the blade is positioned at one side of the machine 1.

Another feature of the steering control is that, when starting the motor the joystick must be in neutral position to be able to be activated, so the machine will not move when the joystick is activated.

There is a sensor measuring the strain on the flexible casing, wires, cables, etc. and that stops forward propulsion regardless of joystick input, if a predetermined threshold is succeeded. The machine 1 can provide information to the operator before this threshold has been reach, for instance be signaling with a green color if there is no or little tension, orange if the tension is closer to critical, and red if the machine is about to stop forward propulsion.

In one embodiment there is provided a fluid pressure sensor that stops the rotation of the blade arrangement 2 if the fluid pressure is lost.

In an alternative embodiment each wheel 27a, 28a, 27b, 28b has an individual raising/lowering mechanism, automatically controlled by an electronic control unit (not shown) and/or by the operator. Thereby the laying machine 1 can easily adapt to height changes in the ground level. By having the ground clearance between the main body of the machine 1 and wheels 27a, 28a, 27b, 28b individually controlled the blade arrangement 2 and the consolidation and laying means 3 cannot only be kept from tilting to the left or right when driving on different levels, such as pavement vs. street, or when encountering bump or holes, but they can also be kept from tilting forward or backward if e.g. one of the front wheel drives over a bump.

FIG. 8 shows a reel trailer 40 which is suitably pulled by the laying machine 1. The reel trailer 40 supplies flexible casings, tubes, cables or wires to the laying machine 1 and is equipped with a plurality of reels 41, 42, 43 each being initially fully winded with a flexible casing, tube, cable or wire. The trailer also has a coolant/consolidation liquid tank 45 for supplying liquid to the laying machine 1 for cooling the blade arrangement 2 and/or consolidating the trench 5. From the cable reels 41-43, cables are guided via the guiding members 46 towards the laying machine in front of the trailer 40. The shown embodiment being able to hold 20 reels; i.e. enabling the laying machine 1 to lay up to 20 flexible casings, tubes, cables or wires in the trench. The outer reels 41 are easily accessed and can hence easily be replaced when empty. To change the upper inner reels 43, a central bar 44 at each side of the trailer 40 which holds a pair of upper inner reels 43 can be displaced forward respectively rearward to provide enough space for removal of an upper inner reel 43. The lower inner reels 42, hanging in front of the coolant/consolidation liquid tank 45, are each arranged on a pivotable arm 47 (in the shown embodiment there is in total four pivotable arms 47). By pivoting the arm 47 outwardly a lower inner reel 42 can be replaced.

In FIG. 9 a laying machine 1 is pulling a second reel trailer 400, according to another embodiment. A dust collector 500 is also connected to the laying machine 1 collecting dust from the laying machine 1. The reel trailer includes a plurality of reels 401 having their axis transversal to the driving direction, which makes it easy to roll of flexible casings, tubes, cables or wires 405. The flexible casings, tubes, cables or wires 405 are guided by an overhead guiding system 402, 403 including two horizontal tubes, a left hand tube 402 and a right hand tube 403, above the reels 401 and extending in the driving direction. Each tube has several inlets 402a, 403a to the tube and the tube guides the wires towards the laying machine 1. The laying machine 1 is connected to the reel trailer 400 by a rod, with one flexible joint at each end. The reel trailer 400 also includes a fluid tank 404, that supplies fluid through a hose that is guided in the left hand tube 402. Also seen in the figure is a full dust collector that has been disconnected from the laying machine in favor of a new and empty dust collector 500.

FIG. 11-14 shows a blade arrangement in the form of a blade assembly 200, according to one embodiment, that is suitable for cutting a trench with the laying machine 1. The blade assembly 200 includes an inner first blade 201 and intermediate second blade 202 and an outer third blade 203.

Each blade 201; 202; 203 having a working portion 201a; 202a; 203a at the periphery of the blade and a central portion 201c; 202c; 203c around the centre of the blade, and a blade support structure 201b; 202b; 203b extending between the working portion 201a; 202a; 203a and the central portion 201c; 202c; 203c.

The blades are preferably steel plates having diamond-impregnated segments at the periphery. The total width of the blade assembly 200 at is periphery is preferably 15-25 mm. The diameters of the first and third blades are preferably in the range 500-1200 mm. The second blade 202 can be of equal diameter or up to 100 mm shorter.

A first spacer structure 204 is arranged between the first blade 201 and the second blade 202, and a corresponding second spacer structure 205 is arranged between the second blade 202 and the third blade 203. The spacer structures 204, 205 are of flat circular shape with a plurality of radially extending triangular shaped holes that are evenly distributed around the centre of the spacer structure 204, 205. The holes in the spacer structures 204, 205 provide a plurality of compartments 206, 207 together with the two neighboring blades 201,202; 202, 203, a plurality of first compartments 206 between the first and second blade and a plurality of second compartments 207 between the second and third blade. The segments of the spacer structures 204, 205 that enclose the holes provide the side walls 206a, 206b; 207a, 207b of the compartments and the two neighboring blades 201,202; 202, 203 provides the axial walls.

Each compartment 206, 207 has two radial extending side walls 206a, 207a that both extends radially from a predetermined distance from the axial center of the blades, preferably within 150 mm from the center. The two radial extending sidewalls 206a; 207a of compartment 206, 207 are preferably of equal length. The compartments 206, 207 have a third side wall extending between the two side walls defining the outer edge of the compartments 206, 207. The third side wall is located at a distance closer to the periphery of the blades 201, 202, 203 than to the center of the blades, preferably within 200 mm from the periphery. The third side wall is preferably straight or concave.

The number of compartments between two neighboring blades should be at least one, preferably the number is in the range of 3-20, more preferably 7-15. In the shown embodiment the number is 12. For cooling purposes, the area that the side walls cover on the blade is preferably as large as possible. However, the spacer structure also functions as supporting structure and to some extent as a vibration dampener.

The spacer structure is preferably a disc made of steel. However other materials could be used.

A plurality of first bores 209, one for each first compartment 206, perforates the first blade 201 to reach each of the first compartments 206 at or close to the intersection of its two radial extending sidewalls 206b, i.e. at a position close to the centre of the blades. The second blade 202 have a plurality of second bores 209, one for each second compartment 207, that each are positioned to extend from the first compartments 206 at or close to the intersection of its two radial extending sidewalls 206b, i.e. opposite to the first bores 209, to reach a corresponding second compartment 207, i.e. at or close to the intersection of its two radial extending sidewalls 207b.

The blade assembly is clamped together at the central portion of the blades between an inner member 210 and an outer member 211, a plurality of securing bolts 212 extending through bores in the blades and spacer structure. The blade assembly is also secured by a plurality of bolts 213 at the periphery of the blades and the spacer structures, and at intermediate position between the periphery and the centre. The bolts 213 extend through the three blades and the two spacer structures, and are arranged to protrude the spacer structure at the structural part thereof.

The inner member 210 includes an outer sleeve 214 for connecting the blade assembly 200 to a blade driving shaft (not shown) of the machine 1. The outer sleeve 214 includes a central bolt 215 for securing to the blade driving shaft. The inner member 210 also includes a circular flange 216 that projects transversal from the first blade 201 and surrounds the sleeve 214, and forming a circular recess 217 between the sleeve 214 and the flange 216. The free end of the flange 216 has an inwardly extending brim 218 that partly is covering the circular recess 217. At the bottom of the recess 217 adjacent to the inner side walls of the flange 216 there are provided a plurality of third bores 219, one for each first bores 208, for connecting to the first bores 209 of the first blade 201.

When connected to the blade driving shaft (not shown) a spraying nozzle (not shown) is arranged to mate the circular recess 217. During operation, fluid is sprayed towards the circular recess 217. The inward brim 218 helps forming a channel as the centripetal forces urges the fluid to flow radially, which urges the fluid to fill the first and second compartments 206, 207 via the connecting bores 208, 209, 219. Due to the high rotation of the blade assembly 200 and tolerances between the blades 201, 202, 203 and the spacer structures 204, 205, fluid will slowly exit the compartments 206, 207 at the side walls of the compartments 206, 207 facing the periphery, i.e. the third side walls 206b, 207b. The fluid filled compartments 206, 207 and the slow flow there from will efficiently cool the blades 201, 202, 203 and provide moisture to the dust reducing dusting problems.

Besides cooling the blades via the cooling compartments via the fluid flow through the compartments 206, 207, fluid can be sprayed to the outer side/s of the first and/or third blade.

Even though the number of blades have been described as three, it would be possible to use only two blades and with one spacer structure in between. Furthermore it could be possible to use even more blades, adding one spacer structure for each added blade.

This kind of blade assembly could be used in other machines than the one described in the present application using circular cutting blades.

To increase flow of fluid from the compartments, apertures may be formed in the side wall/s facing the periphery.

Even though the preferred form for the compartments is the triangular shape described above, it would be possible to have other shapes. Furthermore the some or all of the compartments could be interconnected.

The compartments 206, 207 could be made to start outside the central portions, by having interconnecting channels from the central portions. Further a compartment could be arranged as a volume enclosed solely or partly within the spacer itself.

When using the term central portion 201c, 202c, 203c, the extension of it should be interpreted as the largest area covered by the inner and outer members 210, 211.

Even though we have described a blade assembly 200 where the fluid is supplied outside the axial centre and from the machine side, it would be possible to supply fluid through the axial center. For instance by using a hollow drive shaft and having openings in the drive shaft to the compartments in the blade assembly. Alternatively fluid may be supplied at the opposite side to where the drive shaft connects. In such case, a recess in the outer member with radial openings to the compartments may be provided.

One or both of the axial walls of the compartments could be provided by the spacer structure. In the case of one axial wall provided by the spacer structure; instead of holes, machined recesses in the structure could be provided. In the case of two axial walls provided by the spacer structure; the spacer structure could include two parts both having machined recesses that are mounted facing each other.

The fluid use to cool the blades is preferably water.

The invention claimed is:

1. A laying machine for laying at least one flexible casing or tube, cable or wire comprising:
    a blade arrangement for making a trench in a ground,
    a motor configured to rotatably drive the blade arrangement, and
    a consolidation and laying means being arranged behind the blade arrangement and configured to clear and safeguard the trench from collapsing while laying the at least one flexible casing or tube, cable or wire into the trench, wherein the consolidation and laying means comprises a concave front end which faces and follows a periphery of the blade arrangement;
    wherein the blade arrangement is a blade assembly comprising:
    a first blade, a second blade, and a third blade that are axially aligned, each of the first blade, the second blade, and the third blade having a working portion at an outer periphery of the respective blade, a central portion around an axial center of the respective blade, and a blade support structure extending between the working portion and the central portion, and
    a first spacer structure disposed between the first blade and the second blade and a second spacer structure disposed between the second blade and the third blade, each of the first and second spacer structure comprising a center, a plurality of segments extending from the center toward an outer periphery of the blade assembly, and a hole disposed between each segment of the plurality of segments to form a compartment between neighboring blades of the blade assembly, wherein the first blade comprises a plurality of first bores, each one of the plurality of first bores perforating the first blade into a respective compartment of the first spacer structure, and wherein the second blade comprises a plurality of second bores corresponding and axially aligned with the plurality of first bores, each one of the plurality of second bores perforating the second blade to extend between corresponding compartments of the first spacer structure and the second spacer structure.

2. The laying machine according to claim 1, wherein the consolidation and laying means further comprises a first sidewall and a second sidewall extending to a bottom, the bottom being disposed above a lowest portion of the blade arrangement.

3. The laying machine according to claim 1, wherein the laying machine further comprises:
a temperature sensor for sensing a temperature of the blade arrangement.

4. The laying machine according to claim 1, wherein the laying machine further comprises:
a disc guard that covers a portion of the blade arrangement that is above ground during trench making, the disc guard having a width slightly larger than a width of the blade, and
a dust duct having a dust outlet for exiting dust or debris from a volume confined by the disc guard.

5. The laying machine according to claim 4, wherein the dust duct has a dust inlet arranged close to the ground and the blade arrangement.

6. The laying machine according to claim 5, wherein an upper wall of the dust duct is at least partly defined by a flexible sealing member sealing towards the blade arrangement.

7. The laying machine according to claim 1, wherein a distance between the blade arrangement and the concave front end of the consolidation and laying means is in the range of 0-40 mm.

8. The laying machine according to claim 7, wherein a clearance between the concave front end and the blade arrangement is less than 50 mm.

9. The laying machine according to claim 2, wherein the consolidation and laying means further comprises at least one feeding duct disposed between the first sidewall and the second sidewall, and wherein the at least one feeding duct has an inlet at an upper portion of the consolidation and laying means for receiving a flexible casing or tube, cable, or wire and an outlet at a rear end of the consolidation and laying means for feeding the flexible casing or tube, cable, or wire to the trench.

10. The laying machine according to claim 1, wherein the consolidation and laying means has a same thickness or is less than 1 mm thinner than the blade arrangement.

11. The laying machine according to claim 1, wherein the consolidation and laying means is thinner than the blade arrangement.

12. The laying machine according to claim 1, wherein a cutting portion of the blade arrangement is 5-50 mm thick.

13. The laying machine according to claim 2, wherein the at least one feeding duct comprises at least two feeding ducts.

14. The laying machine according to claim 1, wherein during a trench making, consolidation and laying operation, the blade arrangement is arranged to rotate so that a lower portion of the blade arrangement moves in the driving direction of the laying machine.

15. The laying machine according to claim 4, wherein a dust collector in the form of a wheeled unit is connected to the dust outlet for receiving the dust and debris.

16. The laying machine according to claim 15, wherein the dust collector is arranged in front of the blade arrangement and being arranged to be pushed by the laying machine.

17. The laying machine according to claim 15, wherein the dust collector includes an inner compartment having an opening for the dust outlet and a lid.

18. The laying machine according to claim 1, wherein the plurality of first bores and the plurality of second bores are disposed proximate to the central portion of the first blade and the second blade respectively.

19. A blade assembly for working on a work surface, the blade assembly comprising:
at least a first blade, a second blade, and a third blade that are axially aligned, each of the first blade, the second blade, and the third blade comprising a working portion at an outer periphery of the respective blade, a central portion around an axial center of the respective blade for being operated on by a device for driving the blade assembly, and a blade support structure extending between the working portion and the central portion, and
a first spacer structure disposed between the first blade and the second blade and a second spacer structure disposed between the second blade and the third blade, each of the first and second spacer structure comprising a center, a plurality of segments extending from the center toward an outer periphery of the blade assembly, and a hole disposed between each segment of the plurality of segments to form a compartment between neighboring blades of the blade assembly,
wherein the first blade comprises a plurality of first bores, each one of the plurality of first bores perforating the first blade into a respective compartment of the first spacer structure, and
wherein the second blade comprises a plurality of second bores corresponding and axially aligned with the plurality of first bores, each one of the plurality of second bores perforating the second blade to extend between corresponding compartments of the first spacer structure and the second spacer structure.

20. The blade assembly according to claim 19, wherein fluid is added to at least one outer side of the blade assembly.

21. The blade assembly according to claim 19, wherein the plurality of first bores and the plurality of second bores are disposed proximate to the central portion of the first blade and the second blade respectively.

22. A blade assembly for working on a work surface, the blade assembly including:
at least a first blade, a second blade, and a third blade that are axially aligned, each of the first blade, the second blade, and the third blade comprising a working portion at an outer periphery of the respective blade, a central portion around an axial center of the blade for being rotatably driven by a motor of a device for driving the blade assembly, and a blade support structure extending between the working portion and the central portion, and
a first spacer structure disposed between the first blade and the second blade and a second spacer structure disposed between the second blade and the third blade, each of the first and second spacer structure comprising a center, a plurality of segments extending from the center toward an outer periphery of the blade assembly, and an aperture disposed between each segment of the plurality of segments to form a compartment between neighboring blades of the blade assembly, each segment forming a sidewall of an adjacent aperture, wherein the first blade comprises a plurality of first bores, each one of the plurality of first bores perforating the first blade into a respective compartment of the first spacer structure, and wherein the second blade comprises a plurality of second bores corresponding and axially aligned with the plurality of first bores, each one of the plurality of second bores perforating the second blade to extend between corresponding compartments of the first spacer structure and the second spacer structure.

23. The blade assembly according to claim 22, wherein the plurality of first bores and the plurality of second bores are disposed proximate to the central portion of the first blade and the second blade respectively.

24. A saw comprising:
a blade arrangement for making a trench in a ground; and
a motor configured to rotatably drive the blade arrangement,
wherein the blade arrangement is a blade assembly comprising:
at least a first blade, a second blade, and a third blade that are axially aligned, each of the first blade, the second blade, and the third blade comprising a working portion at an outer periphery of the respective blade, a central portion around an axial center of the blade, and a blade support structure extending between the working portion and the central portion, and a first spacer structure disposed between the first blade and the second blade and a second spacer structure disposed between the second blade and the third blade, each of the first and second spacer structure comprising a center, a plurality of segments extending from the center toward an outer periphery of the blade assembly, and a hole disposed between each segment of the plurality of segments to form a compartment between neighboring blades of the blade assembly, wherein the first blade comprises a plurality of first bores, each one of the plurality of first bores perforating the first blade into a respective compartment of the first spacer structure, and wherein the second blade comprises a plurality of second bores corresponding and axially aligned with the plurality of first bores, each one of the plurality of second bores perforating the second blade to extend between corresponding compartments of the first spacer structure and the second spacer structure.

25. The saw according to claim 24, wherein the plurality of first bores and the plurality of second bores are disposed proximate to the central portion of the first blade and the second blade respectively.

* * * * *